: 3,684,710
Patented Aug. 15, 1972

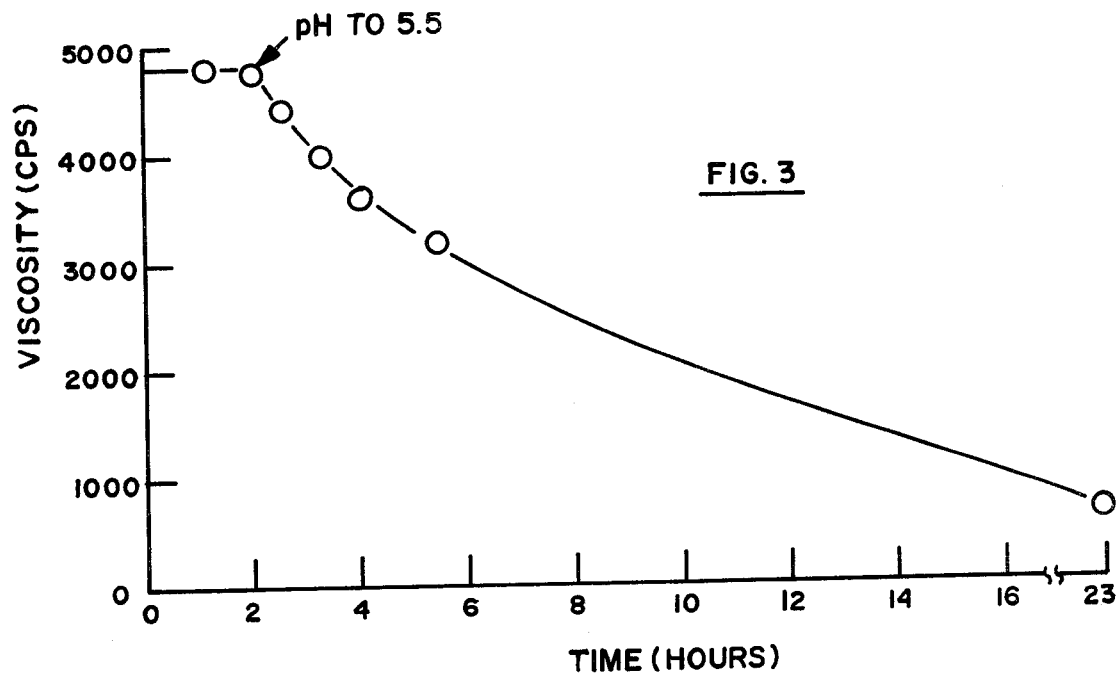

3,684,710
MANNAN DEPOLYMERASE ENZYME COMBINATION
Theodore Cayle, Morganville, N.J., and Hans Schleich, Staten Island, N.Y., assignors to Baxter Laboratories, Inc., Morton Grove, Ill.
Continuation-in-part of application Ser. No. 538,409, Mar. 29, 1966. This application Dec. 19, 1969, Ser. No. 886,537
Int. Cl. E21b 43/25
U.S. Cl. 252—8.55 R  9 Claims

ABSTRACT OF THE DISCLOSURE

A dry enzyme composition having improved pH-stability and pH-activity characteristics in aqueous solution consisting of a galactomannan polymer in combination with a mixture of mannan depolymerase enzyme components from *B. subtilis* and *A. niger* microorganisms.

CROSS-REFERENCE TO RELATED APPLICATION

This is a continuation-in-part of application Ser. No. 538,409, filed Mar. 29, 1966, now abandoned.

This invention relates to a combination of two enzymes from different microbiological sources with the same substrate specificity, but with different characteristics with respect to pH-activity and pH-stability. More particularly, this invention relates to a combination of two mannan depolymerases, one derived from the *Bacillus subtilis* group, the other from the *Aspergillus niger* group.

Mannan depolymerase is the name applied to a hydrolase enzyme which acts on a number of natural plant gums containing galactomannan polymers. Such a carbohydrate is a major constituent of commercial guar gum and locust bean gum, well-known water soluble thickening agents. The mannan depolymerase is capable of producing a cleavage in the substrate by the addition of water and thereby causing a reduction in viscosity of the gum solution.

As is well known, enzymes are very sensitive to pH changes. That is, their stability and activities are greatly influenced by the pH or the hydrogen ion concentration of the medium in which they exist. Therefore, in the usual enzymatic process it is necessary to carefully control the pH of the system, such as by the use of buffers, so that optimum usage of the enzyme can be obtained.

Due to the extreme sensitivity of enzymes to changes in pH, however, it has been found that the usefulness of many enzyme systems in practical commercial processes is severely limited or else the systems are subject to less than optimum usage.

In its broader aspect the present invention concerns a stable enzyme composition comprising two different mannan depolymerase enzyme components, each enzyme component having its own distinct pH-stability and pH-activity characteristics. Preferably, one enzyme component is derived from the *Bacillus subtilis* group and the other is derived from the *Aspergillus niger* group. It has been found that each of these enzyme components separately exhibits its own pH-stability and pH-activity characteristics in aqueous solution whereby one component is stable over a broad pH range and has optimum activity at a relatively low pH, the other component having optimum stability and activity at relatively higher pH. The combination of these two enzyme components makes available for the first time a formulation which permits a commercially practicable use for enzymes in a field of technology in which enzyme use had not been considered feasible. The availability of this formulation having improved activity characteristics makes it possible to greatly extend the usefulness of mannan depolymerase enzymes.

In accordance with the present invention, the stability and activity characteristics of the enzyme composition described herein are employed in said composition in dry admixture with guar gum or other galactomannan polymers and in an aqueous fluid for treating oil wells.

Various fluids are used in well-treating operations. A major use of fluids is in the fracturing of earth formations. In these procedures fluid is introduced into the well and forced into surrounding earth formations by the use of hydraulic pressure. Although hydraulic fracturing fluids may be based on petroleum fractions, it is more usual to employ water-based fluids containing either pure water or brine in major proportions.

In addition to the water-based fluids, it is customary to employ in the well-treating fluid additives which are able to provide suitable viscosity to the fluid to maintain entrained solids in suspension. Examples of such additives are guar gum, alginates, starch, pectin, gelatin and other hydrophilic colloids. The high viscosity imparted by these additives assists the well-treating fluid in carrying suspended sand and other particles into the formations under pressure during the fracturing process as a means of opening fissures. Upon completion of the fracturing, it is desirable to reduce the viscosity of the well-treating fluid so that it can be pumped out, allowing oil and other valuable trapped products to escape.

The step of reducing the viscosity of the well-treating fluid in order to facilitate its removal from the producing formation is known in the art as "breaking." Breaking can be done naturally by bacterial degradation or by subjection to high temperatures. These methods suffer from the excessive length of time required to complete the breaking, such as several days or longer.

Another method of breaking employs the use of enzymes such as described in Menaul, U.S. Pats. 2,681,704 and 2,801,218. While the ordinary use of enzymes provides a more rapid breaking than obtained with the above natural methods, it has several disadvantages. The enzymes are normally mixed with the viscous additive, such as guar gum, prior to introducing the additive into the well. The mixture of the guar gum and the enzymes is fairly stable during storage in the dry state. But as soon as the mixture is hydrated at the surface before injection into the well, the enzyme action begins to hydrolyze the guar gum and reduce its viscosity. As long as two hours may be required to hydrate the guar gum before it is injected into the well. The considerable degree of hydrolysis which takes place during this time will negate some of the important benefits to be obtained with the guar gum.

It has been found that the enzyme composition comprising the two different mannan depolymerase enzyme components hereinbefore described, preferably one derived from the *Bacillus subtilis* group and the other derived from the *Aspergillus niger* group, not only provides the above described pH-stability and pH-activity characteristics in usage but also provides a remarkable inactivity at pH 9. A stable aqueous mixture can be made with the guar gum or other galactomannan polymer prior to introducing the gum into the well which when adjusted to pH 9 will not result in loss of viscosity of the gum for several hours upon addition of this enzyme composition.

After the aqueous enzyme-gum mixture is added to the well, the natural pH of the earth, which is generally below pH 9, will serve to activate the enzyme and the enzyme will exhibit activity characteristics over the broad pH range hereinbefore described. Thus, by the judicious application of the pH-stability and pH-activity characteristics of the novel combination enzyme composition of this invention, a sustained release or delayed action effect is obtained which is a valuable adjunct to well-treating operations.

The respective activities and stabilities of enzymes in solution can be conveniently shown by means of stability and activity curves which are essentially plots of the enzyme stability and activities, respectively, against the pH of the medium.

The substantial improvement of pH-stability and pH-activity obtained by the enzyme composition described herein can be shown by means of such pH-stability and pH-activity curves as set forth in the drawings attached hereto.

Similarly, the substantial improvements in the sustained release or delayed action of the enzyme composition can be shown by means of a plot of viscosity against the pH of the medium as set forth in the drawings attached hereto.

The invention may be better understood by reference to the drawings in which:

FIG. 3 shows the sustained release or delayed action observed with the enzyme composition of this invention incubated in guar solution.

Figure 1:
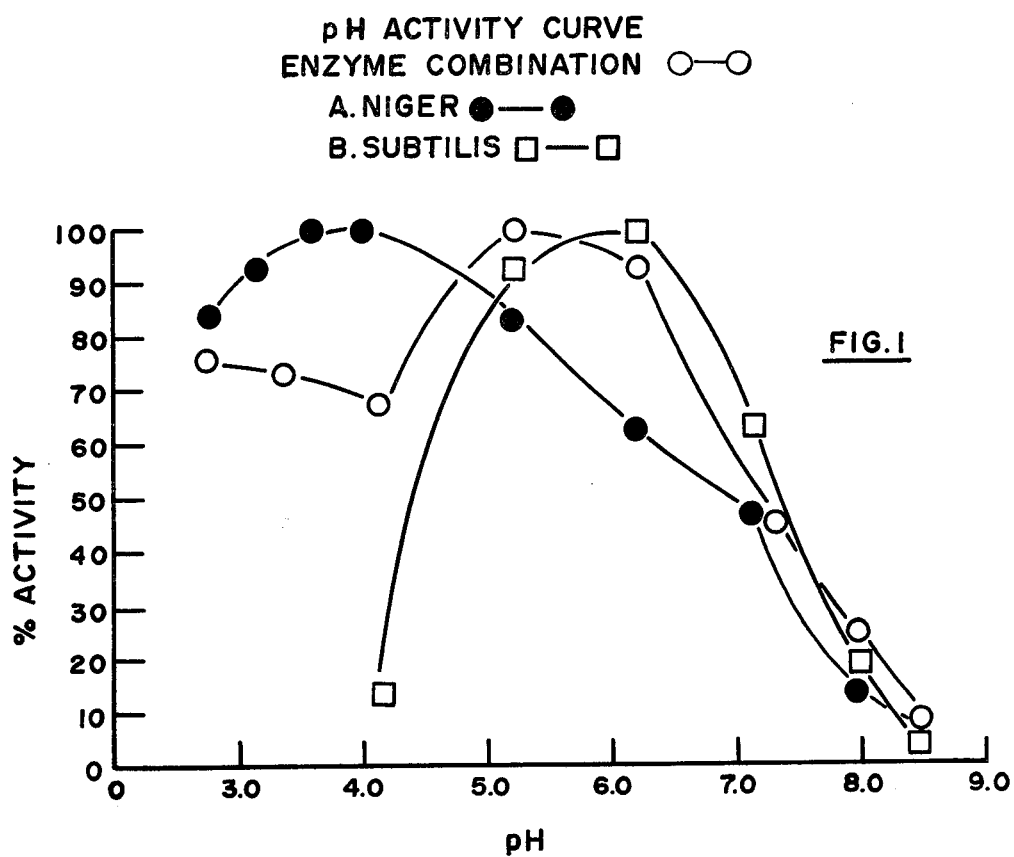
FIG. 1 shows the pH-activity curve of the enzyme composition of this invention as well as that of the *Bacillus subtilis* and *Aspergillus niger* components.

Referring to FIG. 1, it will be noted that the combination enzyme composition has a much broader range of activity than shown by either of the separate enzyme components. A combination enzyme exhibits approximately 70% of its activity from pH 7 down to pH 2.7 (the lowest point of measurement).

Figure 2:
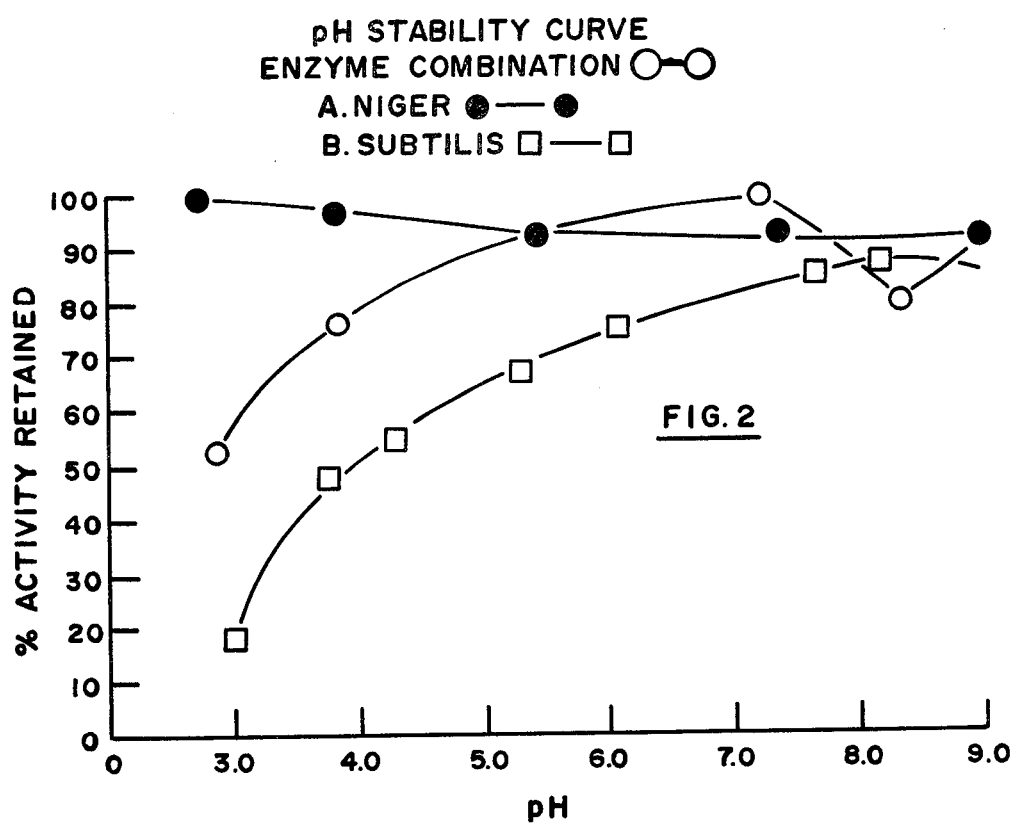
FIG. 2 shows the pH-stability curve of the enzyme composition of this invention as well as that of the *Bacillus subtilis* and *Aspergillus niger* components.

In FIG. 2, it can be seen that the combination enzyme composition has much better stability characteristics than exhibited by the *Bacillus subtilis* enzyme alone. It achieves this by taking advantage of the superior pH-stability characteristics of the *Aspergillus niger* enzyme. The combination enzyme retains at least 50% of its activity from pH 9 down to pH 2.7, and approximately 80% of its activity between pH 9 and 4.

FIG. 3 shows that the aqueous enzyme-guar well-treating solution maintains an essentially constant viscosity for up to two hours at pH 9 and after adjustment to pH 5.5 exhibits a natural decay curve over the next 21 hours.

In the drawings, the enzyme compositions were prepared as described in the examples set forth below, although it will be understood that these examples are illustrative and not limitative of the invention described and claimed herein.

The *Bacillus subtilis* and *Aspergillus niger* microorganisms used in this invention are well-known species. Thus, *Bacillus subtilis* is a widely distributed, spore-forming, aerobic and catalase-positive bacteria classified in Bergey's "Manual of Determinative Bacteriology," Williams & Wilkins Co., Baltimore, pp. 708–12 (6th ed., 1948) and pp. 613–21 (7th ed., 1957). *Aspergillus niger* is a widely distributed, filamentous black mold described by Thom and Raper, "A Manual of the Aspergilli," Williams & Wilkins Co., pp. 214–40 (1945).

As used herein, the *Bacillus subtilis* group also includes, for example *B. agri*, *B. amyloliquefaciens* and *B. licheniformis*, and the *Aspergillus niger* group also includes, for example, *A. awamori*, *A. phoenicis*, *A. luchuensis* and the like microorganisms described by Thom and Raper, ibid. *B. agri* has been identified and described by Laubach and Rice, J. Bact., 1, pp. 516–33 (1916), Byran et al., "Bacteriology Principles and Practice," Barnes & Noble, Inc., New York (6th ed., 1962), at p. 112, and in Bergey's "Manual," at p. 737 (6th ed., 1948), although its naming was subsequently reported as not accepted in the Index Bergeyana, Williams & Wilkins Co., p. 110 (1966). *B. licheniformis* has been identified and described by Weigmann, Cent. f. Bakt. II, abt. 2 (1896), Damodaran et al., Biochem. Biophys. Acta, 17, pp. 99–110 (1955) and in Bergey's "Manual," at p. 747 (6th ed., 1948). *B. amyloliquefaciens* has been identified and described by Fukumoto, J. Agr. Chem. Soc. Japan, 19, pp. 487–503, 634–40 (1943), and Fukuda, J. Agr. Chem. Soc. Japan, 27, pp. 745–9 (1953). As is the case with *B. Agri*, the taxonomic position of the latter two microorganisms also is still uncertain. Some taxonomists regard them as distinct species while others classify them as strains of *B. subtilis*.

The galactomannan polymers used in this invention are well-known gum constituents which are polysaccharide materials obtained principally from guar seeds, the locust bean and similar such seeds. A further description of these substances can be had by reference to such texts as Whistler and Smart, "Polysaccharide Chemistry," Academic Press, New York, pp. 292–301 (1953), Whistler and Be Miller, "Industrial Gums," Academic Press, pp. 4–10, 321 et seq. and 361 et seq. (1959), and Smith and Montgomery, "The Chemistry of Plant Gums and Mucilages," ACS Monograph No. 141, Reinhold Publishing Co., New York, pp. 20–21 (1959).

In the practice of the present invention, the mannan depolymerase enzyme combination is used with the galactomannan polymer in an amount sufficient to provide from about 10 to about 250 mannan depolymerase (MD) units (as described hereinafter) per 100 grams of dry galactomannan polymer. In the enzyme combination from about 40% to about 60% of the mannan depolymerase activity units are provided by each of the respective *Bacillus subtilis* and *Aspergillus niger* enzymes. Preferably, each said enzyme component provides about equal MD activity units to the enzyme composition. In this combination, the mannan depolymerase enzyme component from *Bacillus subtilis* exhibits at least about 70% of its activity at a pH of from about 5 to about 7.5 whereas the mannan depolymerase enzyme component from *Aspergillus niger* exhibits at least about 70% of its activity at a pH of from about 2.5 to about 5.

The enzyme activity described herein is assayed in accordance with the following procedure and based on the ability of the mannan depolymerase enzymes to reduce the viscosity of a solution of guar gum. All parts and percentages herein are by weight unless otherwise specified.

Equipment (1) Brookfield Viscometer, Model LVF, spindle No. 1 and No. 2.
(2) Mechanical stirrer.
(3) 250 ml. beakers for the viscometer.
(4) Constant temperature bath, 25° C.
(5) Stop watch.

Reagents (1) Buffer: 2 M acetate, pH 6.0.
(2) Substrate: Paste 15.2 grams of guar gum (e.g., No. 1 HV, Morningstar Paisley, Inc.) in 18 ml. 99% isopropanol and slowly add to a three liter beaker containing 1500 ml. distilled water plus 100 ml. of buffer with stirring. Transfer gum completely into this solution with distilled water. With constant stirring, make the substrate solution up to 2000 grams. Age the substrate under refrigeration overnight in a tightly closed container. The viscosity of the substrate after attempering at 25° C. and after the addition of 5 ml. of distilled water should be 880–920 cps. with the No. 2 spindle, 30 r.p.m. The pH of the substrate should be 5.8–6.0.

Assay

Weigh 200 grams of the substrate into the 250 ml. beaker. Attemper to 25° C. Add 5 ml. of an enzyme solution containing 6–35 mannan depolymerase (MD) units. Mix thoroughly by hand. Introduce the No. 1 viscometer spindle into the beaker at 12 r.p.m. without removing the beaker from the constant temperature bath. When the viscosity of the gum drops to 400 cps., start the stop watch and stop it when 300 cps. is reached. The elapsed time should be between 1.5 and 10 minutes, though if necessary, longer periods of time may be used.

Calculations

One MD unit is defined as that quantity of enzyme required to reduce the viscosity of 200 grams of a 0.76% guar gum solution from 400 to 300 cps. at pH 5.8–6.0 in one hour at 25° C.

Thus:

$$MD = \frac{1000 \times 60 \times 60}{t \times w}$$

where:

$t$ = time in seconds.
$w$ = weight of enzyme in mg.

The following examples will further illustrate the present invention although it will be understood that the invention is not limited to these specific examples.

EXAMPLE 1

A mannan depolymerase enzyme combination from the *Bacillus subtilis* group and the *Aspergillus niger* group was prepared as follows:

*Aspergillus niger*

To 100 parts of wheat bran was added 60 parts of 0.2 N HCl containing 0.62 p.p.m. $ZnSO_4$, 0.62 p.p.m. $FeSO_4$ and 0.88 p.p.m. $CuSO_4$. The mixture was sterilized with steam and after cooling inoculated with a sporulated inoculum of *Aspergillus niger*. The inoculated bran was maintained at a temperature of 30° C. by passing moist air through the mixture, until testing indicated the presence of substantial quantities of mannan depolymerase.

An aqueous extract was prepared by washing the mixture with four volumes of water. The extract was concentrated by evaporation to a specific gravity of 1.1.

The enzyme can be precipitated from the concentrated liquor using conventional procedures well known to those acquainted with the art. Salts such as ammonium sulfate, sodium sulfate and sodium chloride can be employed, as well as such solvents as ethyl alcohol, methyl alcohol, isopropyl alcohol and acetone.

In this particular case a mixture of 1:1 ammonium sulfate and sodium sulfate was employed at a final concentration of 45%. Enough filter aid was added to enable the precipitated protein to be harvested via filtration, and the filter cake was dried in vacuo. This enzyme concentrate had an MD of approximately 1000.

*Bacillus subtilis*

To a sterilized nutrient medium containing between 10–20% by weight of a starch hydrolysate, 0.5% casein hydrolysate and trace metals consisting of iron, manganese, magnesium, potassium and sodium as their phosphate or sulfate, and brewer's yeast, is added an inoculum of *Bacillus subtilis* var. *agri*. The inoculated medium was maintained under aerobic conditions at pH 7, 37° C. until testing indicated the presence of substantial quantities of mannan depolymerase.

The filtered fermentation liquor was concentrated by evaporation to a specific gravity of 1.1.

The enzyme can be precipitated from the concentrated liquor using conventional procedures well known to those acquainted with the art. Salts such as ammonium sulfate, sodium sulfate, and sodium chloride can be employed, as well as such solvents as ethyl alcohol, methyl alcohol, isopropyl alcohol and acetone.

In this particular case, a mixture of 1:1 methyl alcohol and isopropyl alcohol was employed at a final concentration of 75%. Enough filter aid was added to enable the precipitated protein to be harvested via filtration, and the filter cake was dried in vacuo. This enzyme concentrate had an MD of approximately 3000.

Enzyme composition

In the following parts of this example a quantity of each of the above enzyme concentrates was employed so as to yield a mixture with an MD of 100, half of the units contributed by each enzyme source. A number of diluents can be used, including wood flour, filter aid, flour salt, etc. In this particular example, the diluent was flour salt.

(A)

Data for FIG. 1 was obtained by determining the activity of the individual enzymes and the enzyme composition as a function of pH, using the basic procedure described above under "assay."

Data for FIG. 2 were obtained by determining the activity of the individual enzymes and the enzyme composition with the standard assay procedure after solutions of each had been exposed to various pH's for four hours at 25° C.

(B)

The sustained release or delayed action concept of the enzyme composition was established by selecting a pH from FIGS. 1 and 2 at which the enzyme composition was inactive but stable. Observations indicated pH 9 to be suitable.

A 1.0 percent guar gum solution was prepared and its pH was adjusted to 9.0 with NaOH. Ten MD units per 100 grams of guar gum (dry basis) were added to this solution. This was accomplished by adding 100 mg. of the enzyme composition per 100 grams of gum solids. The same number of units of activity could be added to the gum solution by adding an enzyme composition standardized at a different activity per weight of composition. However, regardless of the total activity of the enzyme composition, it has been found that good sustained release, or delayed action is obtained by having a total of 10 MD units per 100 grams of gum solids, half of the total contributed by the *Bacillus subtilis* enzyme, the other half by the *Aspergillus niger* enzyme.

FIG. 3 shows that the enzyme composition can remain inactive for two hours at pH 9.0 but will start to act when the pH of the mixture is lowered into the region of the pH-activity curve exhibiting enzyme activity. In this case, the pH of the gum solution was adjusted with HCl to 5.5 and the viscosity broke from almost 5000 cps. to 500 cps. over a 21 hour period.

Substantially similar sustained release results are obtained when an equivalent amount of locust bean gum is substituted for the guar gum in this example.

(C)

The rate of viscosity reduction can be regulated by the quantity of enzyme composition employed. Typical results can be seen in Table 1 which summarizes the time required to obtain a fifty percent reduction in guar gum viscosity as a function of MD units present per 100 grams of gum solids. In all cases, the required quantity of enzyme composition was added to 200 grams of a 1% gum solution adjusted to pH 5.5 with HCl. Incubation took place at 25° C.

TABLE 1

| MD units/100 grams gum solids: | Time to attain 50% reduction in viscosity (minutes) |
|---|---|
| 500 | 22 |
| 100 | 60 |
| 10 | 450 |

Thus, if it is desired to break the viscosity of the gum quickly, higher concentrations of the enzyme composition can be employed. It has been found that 10 MD units per 100 grams of gum solids yields a degree of sustained release that extends over approximately a 24 hour period.

A range of 10–250 MD units per 100 grams of gum solids is preferred.

EXAMPLE 2

Example 1 is repeated except that *B. subtilis* strains NRRL B543 and B558, and *B. amyloliquefaciens* strains NCTC 2027 and Fukumoto 476931 are substituted for the *B. subtilis* var. *agri* used in said example and the following fermentation medium is used for growth.

| Component: | Weight Percent |
|---|---|
| Locust bean gum | 3.0 |
| Corn steep liquor | 0.5 |
| Lactose | 0.5 |
| Brewer's yeast | 0.135 |
| $K_2SO_4$ | 0.5 |
| $MgSO_4 \cdot 7H_2O$ | 0.025 |
| NaCl | 0.05 |
| Ferric ammonium citrate | 0.01 |
| $Na_2HPO_4$-$NaH_2PO_4$ mixture at pH 6.6 | 0.05M |
| Lard oil | 0.3 |
| Tap water, q.s. | |
| | 100 |

Substantially similar sustained release or delayed action with the enzyme combination in aqueous solution with guar gum as in Example 1 is obtained.

As will be readily apparent to those skilled in the art, other examples of the herein-defined invention can be devised by various modifications, variations and adaptations without departing from the spirit and scope of the invention after reading the foregoing specification and the claims appended hereto. All such modifications, variations and adaptations are included within the scope of the invention as defined in the appended claims.

What is claimed is:

1. A dry enzyme composition having improved pH-stability and pH-activity characteristics in aqueous solution consisting essentially of galactomannan polymer in combination with mannan depolymerase enzyme components derived from two different species of microorganisms, one component being derived from the *Bacillus subtilis* group and exhibiting at least 70% of its activity at pH 5–7.5, the other component being derived from the *Aspergillus niger* group and exhibiting at least 70% of its activity at pH 2.5–5, said enzyme components each providing from about 40% to about 60% of the mannan depolymerase activity units to the enzyme composition, and said composition consisting of from about 10 to about 250 MD units per 100 grams of dry galactomannan polymer.

2. The composition of claim 1 in which the galactomannan polymer is guar gum.

3. The composition of claim 1 in which the galactomannan polymer is locust bean gum.

4. An aqueous well-treating fluid consisting essentially of water in admixture with the enzyme composition of claim 1 in which the galactomannan polymer is present in an amount sufficient to increase the viscosity of the fluid to a predetermined initial value and the enzyme components are present in amounts sufficient to maintain the initial viscosity of the fluid at a pH of about 9 for a period of about two hours and then break the viscosity of the fluid to a value below the initial viscosity at a pH less than about 9.

5. The aqueous fluid of claim 4 in which the galactomannan polymer is guar gum.

6. The aqueous fluid of claim 4 in which the galactomannan polymer is locust bean gum.

7. In the method of treating wells by introducing an aqueous fluid into the well and forcing into surrounding earth formations by hydraulic pressure, followed by reducing the viscosity of said aqueous fluid upon completion of the fracturing and pumping the fluid out of the well, said aqueous fluid containing additives to provide suitable viscosity to the fluid to maintain entrained solids in suspension, the improvement comprising introducing into the well the aqueous fluid of claim 4.

8. The method of claim 7 in which the galactomannan polymer is guar gum.

9. The method of claim 7 in which the galactomannan polymer is locust bean gum.

References Cited

UNITED STATES PATENTS

| 2,607,359 | 8/1952 | Oesting | 195—62 X |
| 2,681,704 | 6/1954 | Menaul | 252—8.55 X |
| 2,801,218 | 7/1957 | Menaul | 252—8.55 |
| 3,012,944 | 12/1961 | Armbruster | 195—31 |
| 3,167,510 | 1/1965 | Altek | 252—8.55 |

HERBERT B. GUYNN, Primary Examiner

U.S. Cl. X.R.

166—308; 195—62, 66